United States Patent [19]
Eng et al.

[11] Patent Number: 5,610,904
[45] Date of Patent: Mar. 11, 1997

[54] PACKET-BASED TELECOMMUNICATIONS NETWORK

[75] Inventors: Kai Y. Eng, Middletown; Mark J. Karol, Fair Haven; Malathi Veeraraghavan, Atlantic Highlands, all of N.J.

[73] Assignee: Lucent Technologies Inc., Murray Hill, N.J.

[21] Appl. No.: 412,400

[22] Filed: Mar. 28, 1995

[51] Int. Cl.$^6$ .............................. H04L 12/44; H04L 12/56
[52] U.S. Cl. ............................................ 370/408; 370/422
[58] Field of Search ................................ 370/16, 17, 54, 370/60, 79, 94.1, 94.3

[56] References Cited

U.S. PATENT DOCUMENTS

| | | | |
|---|---|---|---|
| 4,987,536 | 1/1991 | Humblet | 370/60 X |
| 5,253,248 | 10/1993 | Dravida et al. | 370/16 |
| 5,428,636 | 6/1995 | Meier | 370/60 X |

OTHER PUBLICATIONS

IEEE Infocom '94 "The Sink Tree Paradigm: Connectionless Traffic Support on ATM LANs" by R. Cohen, B. V. Patel, F. Schaffa, and M. Willebeek–LeMair. Proceedings vol. 2 pp. 821–828. Jun. 12–16, 1994.

Primary Examiner—Douglas W. Olms
Assistant Examiner—Russell W. Blum
Attorney, Agent, or Firm—Thomas Stafford

[57] ABSTRACT

A packet-based telecommunications architecture is disclosed that, like virtual-circuit networks, preserves the sequential order in which packets are presented to the network, but does not require node-by-node call set-up or tear-down, unlike virtual-circuit networks. Further, the packet switches which compose the architecture can be more simple than those used in datagram or virtual-circuit networks. An illustrative embodiment of the present invention comprises determining the topology of a network of packet switches that are connected by communication links, associating at least two names with at least one of the packet switches, and populating the router tables in the packet switches so that for each name the packet switches and communication links form a elemental network with the topology of a sink tree with the named packet switch at the root of the tree.

29 Claims, 8 Drawing Sheets

ELEMENTAL DATAGRAM NETWORK FROM PACKET SWITCH #3 TO PACKET SWITCH #10

FIG. 3
PRIOR ART

ELEMENTAL DATAGRAM NETWORK FROM PACKET SWITCH #13 TO PACKET SWITCH #3

PACKET-BASED TELECOMMUNICATIONS NETWORK

FIELD OF THE INVENTION

The present invention relates to telecommunications in general and, more particularly, to packet-based telecommunications networks.

BACKGROUND OF THE INVENTION

Figure 1:
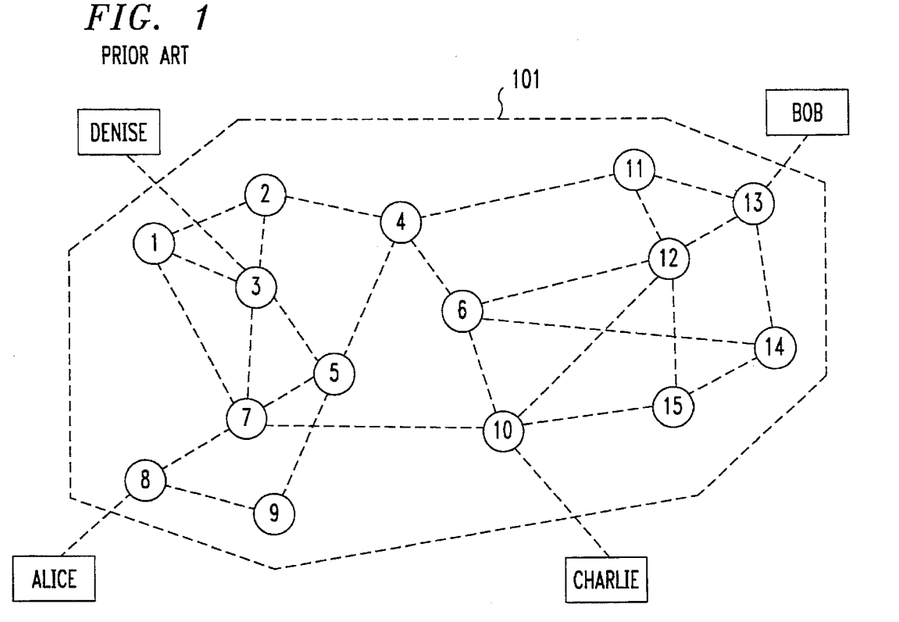
FIG. 1 depicts a packet-based telecommunications network in the prior art.

FIG. 1 depicts a schematic diagram of a packet-based telecommunications network in the prior art, which enables host computers that have access to the network (e.g., Alice, Bob, Charlie and Denise) to communicate. As is typical of packet-based networks in the prior art, network 101 comprises a plurality of geographically distributed packet switches that are interconnected by duplex communication links in the topology of a graph. Each packet switch in network 101 is schematically depicted by a circle that encompasses a unique whole number, from 1 to 15, and each duplex communication link is depicted by a dotted line that interconnects two circles. As shown in FIG. 1, Alice, Bob, Charlie and Denise each have access to network 101 via packet switches #8, #13, #10 and #3, respectively.

When one host with access to network 101 desires to send data to another host with access to the network, the transmitting host parses the information into a set of packets, which are serially presented to the network. Depending on the nature of the data and the convention that the respective hosts have agreed to for communication, the sequential order in which the set of packets are presented to the network might also be the order in which the packets are preferably delivered by the network. In other words, in some cases it may be advantageous for network 101 to preserve the sequential order of the packets, and in other cases it may be inconsequential.

As known in the prior art, there are two fundamentally different techniques that network 101 can use to route packets from the transmitting host to the destination host: (1) connectionless (i.e., datagram) service, which does not preserve the sequential order of the packets, and (2) connection-oriented (i.e., virtual-circuit) service, which does preserve the sequential order of the packets. Both datagram service and virtual service have their respective advantages and disadvantages, which will be described in detail below. The book *Computer Networks, 2nd Ed.*, by Andrew S. Tanenbaum, Prentice-Hall, Inc., provides an excellent introduction to packet-based telecommunications and is hereby incorporated by reference as if set forth in its entirety.

An understanding of datagram service is facilitated by analogy to the postal system. In the same manner that the postal system handles each piece of mail separately, and without regard to another piece of mail, networks that provide datagram service handle each packet separately. To use the postal system, a postal patron must put the complete address of the addressee on each piece of mail, even though the same patron may mail multiple pieces of mail to the same addressee at the same time and from the same place. Similarly, a host that uses a network that provides datagram service must include the complete address of the ultimate destination of the packet with each packet, even though a single host may transmit a thousand packets to the same destination.

With regard to the postal system, the requirement that each piece of mail contain a complete postal address is further necessitated by the fact that each piece of mail can take alternative routes to the same ultimate destination. And because the length of each route can vary, and so too the speed through each route, two pieces of mail that were mailed concurrently can arrive at different times. It is also further the case that two pieces of mail, mailed sequentially from the same place and to the same ultimate destination can arrive out of order. Analogously, a datagram network can transport packets via different routes such that a set of packets that were presented to the network in one sequential order can be delivered by the network in a different order.

To reduce the need for redundant hardware (e.g., power supplies, memory, telephone poles, etc.), multiple elemental networks, such as those depicted in FIGS. 2–5, are usually fabricated as a composite physical network, as shown in FIG. 1. For example, a duplex communication channel or network is, in reality, a composite of two simplex communication channels or elemental networks. For the purposes of this specification, an elemental network is defined as one or more integrated simplex communication channels that are capable of delivering packets to a destination, which destination may be a packet switch or host computer.

Figure 2:
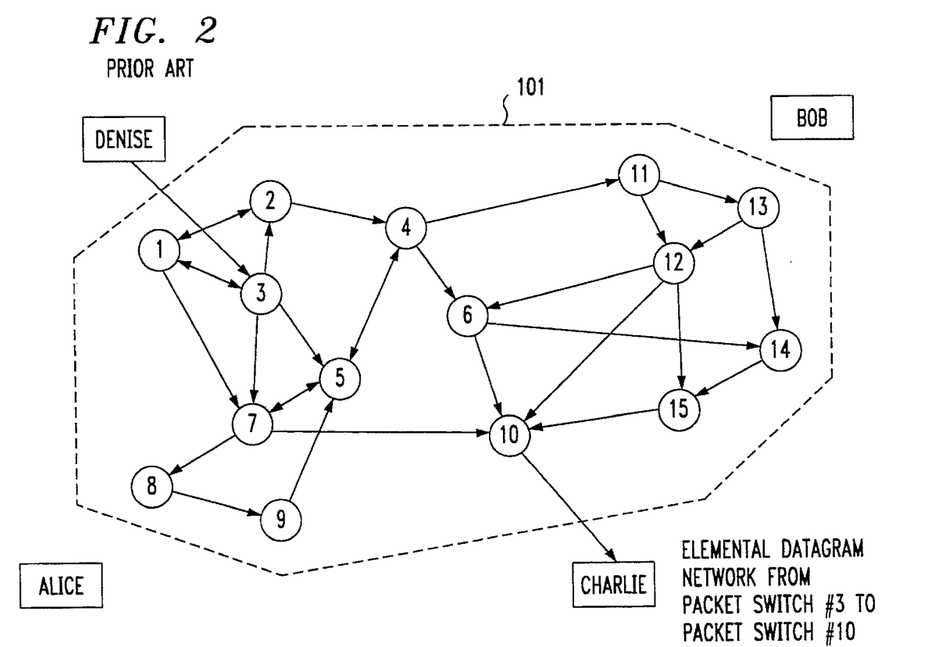
FIG. 2 depicts a first elemental network, configured to provide datagram service, that is a component of the network in FIG. 1.
Figure 3:
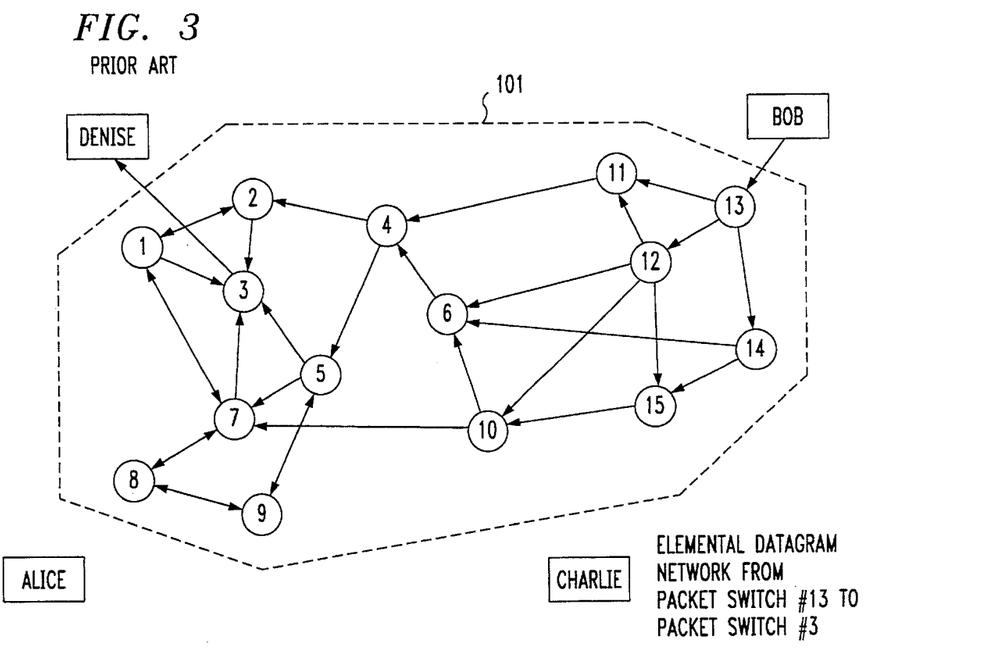
FIG. 3 depicts a second elemental network, configured to provide datagram service, that is a component of the network in FIG. 1.

Both FIGS. 2 and 3 depict examples of elemental networks, in accordance with connectionless techniques well known in the prior art. FIG. 2 depicts an elemental network that transports packets from packet switch #3 to packet switch #10 and FIG. 3 depicts a elemental network that transports packets from packet switch #13 to packet switch #3.

Each packet switch in a network that provides datagram service contains a router table that indicates where it should route packets that arrive at it. Table 1 depicts a typical router table that might be associated with packet switch #3 in FIG. 1 (when network 101 provides only datagram service). When a packet arrives at a packet switch, the packet switch looks at the address in the packet's addressee field and uses that address as an index into the router table to determine to which neighboring packet switch the packet should be routed. For example, the neighboring packet switches of packet switch #3 are packet switches #1, #2, #5 and #7. In this manner, packets are handed from one packet switch to another, in bucket brigade fashion, until they reach their final destination.

TABLE 1

A Typical Router Table in a Packet Switch
in a Datagram Network (Packet Switch #3)

| Input | Output | | |
|---|---|---|---|
| Address of Addressee | Destination Packet Switch (first choice) | Destination Packet Switch (second choice) | Destination Packet Switch (third choice) |
| 1 | 1 | 2 | 7 |
| 2 | 2 | 1 | 5 |
| 3 | to host | Ð | Ð |
| 4 | 2 | 5 | 7 |
| 5 | 5 | 2 | 7 |
| 6 | 2 | 5 | 7 |
| 7 | 7 | 5 | 1 |
| 8 | 7 | 5 | 1 |
| 9 | 7 | 5 | 1 |
| 10 | 7 | 5 | 1 |
| 11 | 2 | 5 | 7 |
| 12 | 5 | 2 | 7 |
| 13 | 5 | 2 | 7 |
| 14 | 7 | 2 | 5 |
| 15 | 7 | 5 | 2 |

When, for example, a packet enters packet switch #3 with address 10 in the packet's addressee field, the packet switch learns from Table 1 that the preference is to send the packet to packet switch #7. When, however, packet switch #3 determines that the communication link to packet switch #7 is congested, unavailable, or for any other reason, not favorable, the router table indicates that the second choice is to send the packet to packet switch #5. For similar reasons, more alternative choices may also be given. Note that when a packet arrives with address 3 in the packet's addressee field, meaning that the packet has arrived at its destination in the network, the router table indicates that the packet is to be passed to the appropriate host that is associated with the packet switch.

Network control in datagram networks (i.e., the process of dealing with network congestion, packet switch and communication link failure, network administration, network maintenance, etc.) is performed by each packet switch in a distributed fashion and is accomplished by providing each packet switch with alternative destinations to which packets can be routed.

In contrast to datagram service, there exists virtual-circuit service. An understanding of virtual-circuit service is facilitated by analogy to plain, old telephone service. When a person desires to talk to another via the telephone, the calling party "dials" the number of the called party, which is a request to the telephone network to establish a private circuit from the calling party to the called party. Once the circuit is established, the calling party and called party can exchange information, without further interaction with the telephone network. When the parties' conversation is completed, they "hang-up," which indicates to the telephone network that the conversation is completed and that the circuit can be torn-down.

Figure 4:
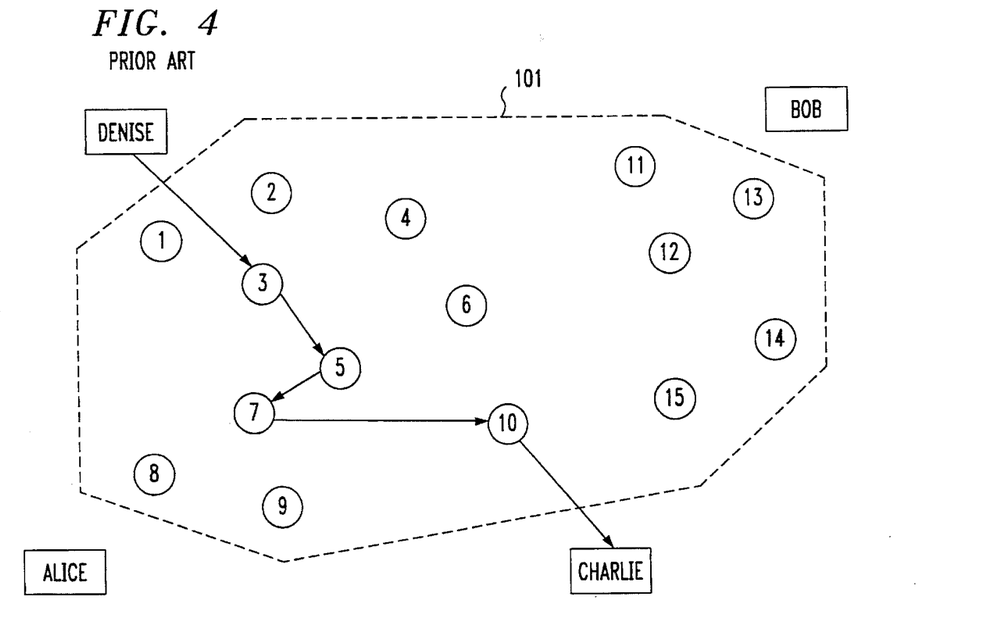
FIG. 4 depicts a third elemental network, configured to provide virtual-circuit service, that is a component of the network in FIG. 1.
Figure 5:
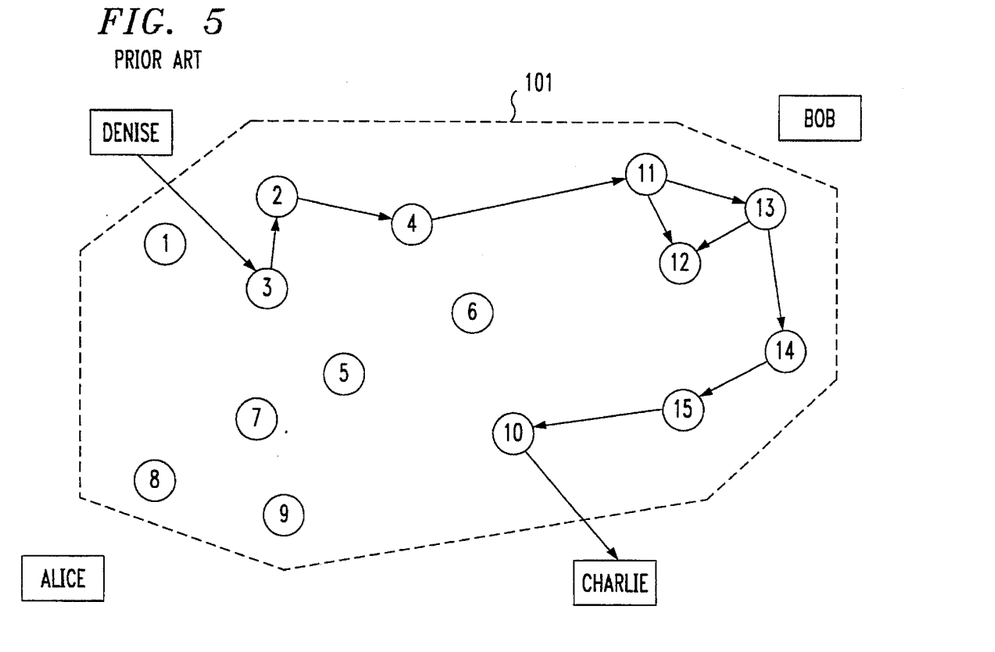
FIG. 5 depicts a fourth elemental network, configured to provide virtual-circuit service, that is a component of the network in FIG. 1.

Analogously, when Denise desires to send packets to Charlie, and network 101 provides virtual-circuit service, Denise must first indicate to network 101 that she desires to be connected with Charlie. Network 101 then uses two elemental networks, one from Denise to Charlie and the second from Charlie to Denise, to establish a virtual-circuit. FIGS. 4 and 5 depict examples of elemental networks from Denise to Charlie.

Once the virtual-circuit between Denise and Charlie is established, all Denise need do to send packets to Charlie is address them with the indicia of the virtual-circuit associated with them both. The network will route the packets along the elemental network and deliver them to Charlie. Analogously, all Charlie need do to send packets to Denise is address them with the indicia of the virtual-circuit associated with them both. The network will route the packets along the elemental network and deliver them to Denise. And because all of the packets follow the same path, the sequential order of the packets is preserved. When Denise and Charlie are finished communicating, either merely indicates to the network that it can tear-down the virtual-circuit.

Although neither Charlie nor Denise is required to address each packet with the address of the ultimate packet switch in the elemental network, each packet is required to carry an identifier of the virtual-circuit that it is associated with. Each packet switch in a network that provides virtual-circuit service contains a router table that guides the packet switch where to route each packet that arrives at it. Table 2 depicts a typical router table that might be associated with packet switch #3 when it provides virtual-circuit service.

TABLE 2

A Typical Router Table in a Virtual Circuit Network

| Inputs | | Outputs | |
|---|---|---|---|
| Previous Packet Switch | Incoming Virtual-Circuit Identifier | Next Packet Switch | Outgoing Virtual-Circuit Identifier |
| 1 | 1 | 2 | 1 |
| 1 | 2 | 2 | 2 |
| 1 | 3 | 7 | 1 |
| 1 | 4 | 5 | 1 |
| 2 | 1 | 1 | 1 |
| 2 | 2 | 5 | 2 |
| 2 | 3 | 7 | 2 |
| 5 | 1 | 5 | 3 |
| 5 | 2 | 2 | 3 |
| 5 | 3 | 5 | 4 |
| 7 | 1 | 2 | 4 |
| 7 | 2 | 7 | 3 |
| 7 | 3 | 7 | 4 |

A packet switch that provides virtual-circuit service must perform a different task than a packet switch that provides datagram service. When, for example, a packet enters packet switch #3 on virtual-channel #3 from packet switch #2, the packet switch uses the router table in Table 2 not only to learn which packet switch the packet is to be routed through, but also with which virtual-channel identifier ("VCI"). Therefore, each packet switch must overwrite, in each packet's VCI field, the name of the outgoing virtual-channel into which the packet is put. In this example, the packet switch outputs the packet to packet switch #7 and overwrites the VCI of 3 with a 2. Virtual-circuit networks deal with network congestion and network failures by setting-up new virtual-circuits in less congested, working parts of the network. In other words, entries are usually made into the router tables in virtual-circuit networks at call set-up, in contrast with datagram networks where in the entries are made into the router tables before call establishment.

There are two principal advantages of datagram networks over virtual-circuit networks: (1) datagram networks do not require connection set-up and tear-down, which can be prohibitively slow or expensive depending on the application, and (2) the packet switches in datagram networks are usually less expensive to build because they do not have to overwrite the VCI field of each packet passing through the packet switch. The principal advantages of virtual-circuit networks over datagram networks is that virtual-circuit networks preserve the sequential order of packets, which is essential for certain applications, and that network control is handled on an ad hoc basis. There is, however, a need for a packet-based telecommunications network architecture that preserves the sequential order of packets, and yet avoids the disadvantages associated with virtual-circuit networks.

SUMMARY OF THE INVENTION

Embodiments of the present invention are packet-based networks that preserve the sequential order of packets, without many of the costs and restrictions found in the prior art. In particular, packets in embodiments of the present invention maintain sequence, unlike in datagram networks, or node-by-node call set-up procedures, as in virtual-circuit networks, in order to preserve the order of the packets. Furthermore, networks that are fabricated in accordance with the present invention can be substantially less expensive to build and operate than similar-capacity networks in the prior art.

An illustrative embodiment of the present invention comprises a plurality of different elemental networks, each of which has the topology of a sink tree with a root, and such that at least one packet switch is the root for at least two of the elemental networks.

DETAILED DESCRIPTION

Figure 6:
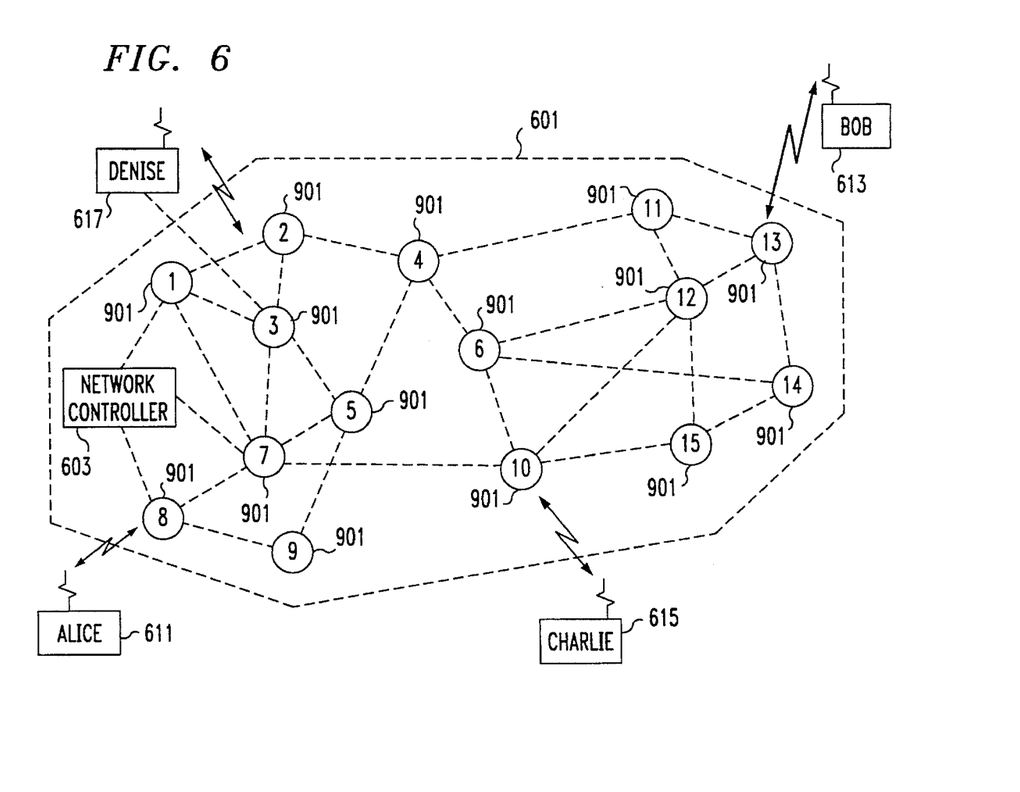
FIG. 6 depicts a packet-based telecommunications network in accordance with the exemplary embodiment.

FIG. 6 depicts a schematic diagram of a packet-based telecommunications network, in accordance with the exemplary embodiment, which enables a plurality of host computers that have access to the network (e.g., Alice 611, Bob 613, Charlie 615, and Denise 617) to communicate. Although each host computer's access to the network can be via either wireline or wireless connection, it is preferred that the connection be wireless. Network 601 preferably comprises a plurality of geographically distributed packet switches that are interconnected by duplex communication links in the topology of a graph. Each physical packet switch in network 601 is schematically depicted by a circle that encompasses a unique whole number, from 1 to 15, and each duplex communication link is depicted by a dotted line that interconnects two circles.

Although the exemplary embodiment is characterized by the topology shown in FIG. 6, it will be clear to those skilled in the art how to make and use networks in accordance with the present invention that have an arbitrary number of packet switches in a different topology. Although the packet switches in the exemplary embodiment are advantageously different than packet switches in the prior art, as will be discussed below, it will be clear to those skilled in the art that with inexpensive modifications, packet switches in the prior art, which provide either datagram service or virtual-circuit service, can be jury-rigged to provide service in accordance with the present invention.

The communication links in each elemental network are preferably simplex and can be fabricated from components and techniques well known in the prior art. When a plurality of elemental networks in accordance with the present invention are fabricated, it will be clear that, in some cases, it will be preferable to fabricate some pairs of simplex communication links from a hardware duplex communication link. It will also be clear that multiple elemental networks in accordance with the illustrative embodiment, in some cases, are preferably fabricated from composite packet switches and duplex communication links. It should be further understood that the communication links that interconnect the various packet switches in embodiments of the present invention can either be wireless (e.g., radio or free-space optics), wireline or a combination of the two. It is preferred, however, that they be wireless.

In addition to the various packet switches and communication links, network 601 preferably further comprises network controller 603, which preferably has the responsibility for the network administration functions that will be discussed below. While network controller 603 can either be (1) centralized, (2) distributed, or (3) at least partially distributed, it is preferred that network controller be distributed among the various packet switches in the network. It will be clear to those skilled in the art how to make and use network controller 603 in accordance with the present invention.

It is further preferred that network controller 603 be capable of accessing, either directly or indirectly, and configuring each packet switch, including its router table, in network 601. From the discussion below, it will be clear to those skilled in the art how to make and use network controller 603 in a manner that is most appropriate to a given network.

Figure 7:
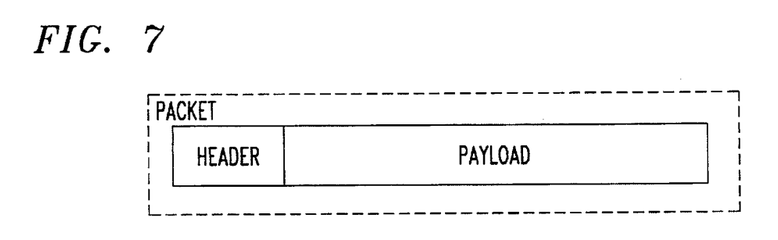
FIG. 7 depicts the format of a packet in accordance with the exemplary embodiment.

As shown in FIG. 7, each packet routed through network 601 preferably comprises a header portion and a payload portion. The format of the payload portion is not a part of the present invention and is agreed to, by convention, by the respective host computers that are communicating using the packet. In some embodiments of the present invention, the standard cell format for Asynchronous Transfer Mode ("ATM") can used, although the meaning given to one or more of the fields in the ATM cell header must be changed in accordance with the present invention.

Figure 8:
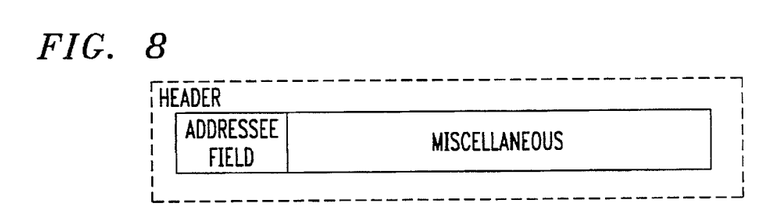
FIG. 8 depicts the format of the header of a packet, in accordance with the exemplary embodiment.

FIG. 8 depicts the preferred format of the header portion of the packet, which preferably comprises an addressee field and a miscellaneous field. The miscellaneous field advantageously comprises error correction and detection information, sequencing information, and the address of the addressor, as is well known to those skilled in the art. In the exemplary embodiment, the addressee field contains an address or name of the destination to which the packet is ultimately addressed. When the packets use the ATM cell format, it is preferred that the Virtual Path Indicator ("VPI") field be interpreted instead as the addressee field and, therefore, that the VPI field contain not an indicator of the virtual path in which the packet is being transmitted, but only the address or name of the destination to which the packet is ultimately addressed.

Figure 9:
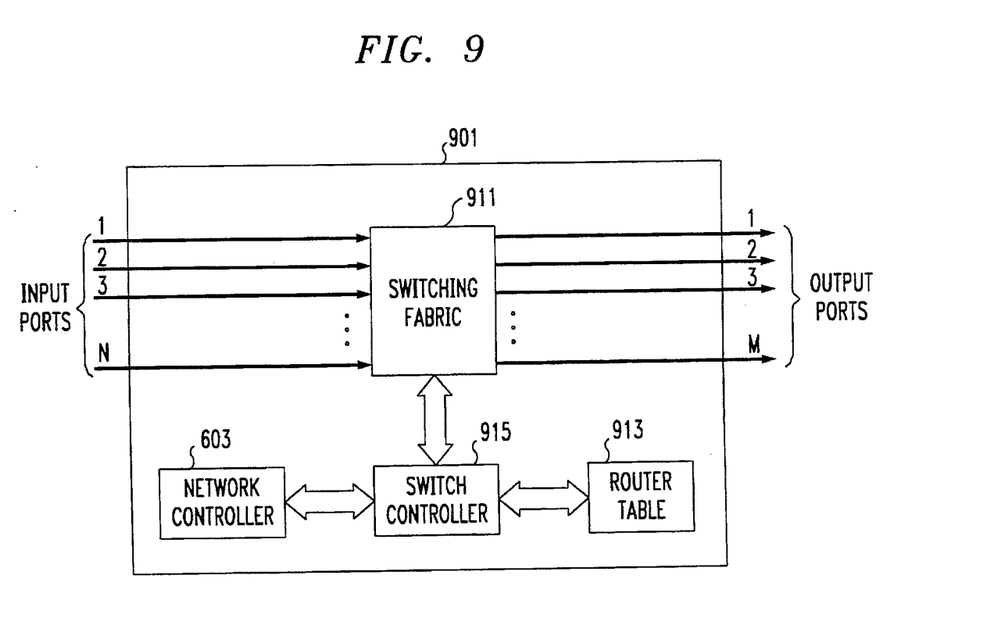
FIG. 9 depicts a block diagram of the architecture of a packet switch in accordance with the exemplary embodiment.

Preferably, each packet switch in network 601 has the design of packet switch 901, shown in FIG. 9. Packet switch 901 preferably comprises one or more input ports, two or more output ports (each one uniquely connected to a neighboring packet switch by a simplex communication link), switching fabric 911 that can route a packet received at any of the input ports to any of the neighbor packet switches (via the appropriate output port), switch controller 915, router table 913, which depending on how it is populated directs switching fabric 911 which output port to direct incoming packets to, and network controller 603. The making and using of switching fabric 911 is well-known in the art and can be fabricated in a myriad number of ways, including: from a time-division switch, a space-division switch, a time-and-space division switch, etc. From the following description, it will be clear to those skilled in the art how to make and use packet switch 901.

TABLE 3

Preferred Router Table Format

| Input | Output |
| --- | --- |
| Address of Addressee | Destination Packet Switch |
|  |  |
|  |  |
|  |  |
|  |  |

Table 3 depicts the preferred format of router table 9 13, which preferably has a plurality of addressee entries and an indicia of a single, neighboring packet switch associated with each of the addressee entries.

In embodiments of the present invention in which scalability is advantageous, router table 913 can alternatively have a format that bases the destination packet switch on both the contents of a packet's addressee field and on the packet switch from which the packet arrived. Table 4 depicts such an alternative table.

TABLE 4

Alternative Router Table Format

| Inputs | | Output |
| --- | --- | --- |
| Address of Addressee | Previous Packet Switch | Destination Packet Switch |
|  |  |  |
|  |  |  |
|  |  |  |
|  |  |  |

For reasons to be discussed below, each packet switch in network 601 is preferably assigned, or has associated with it, a plurality of addresses (alternatively called "names" throughout this specification), although it is only necessary that those packet switches that are the ultimate destination for a packet be even associated with any name. There is no requirement that all of the packet switches in network 601 have the same number of names or that the number of names should be static. On the contrary, depending on various network administration criteria, it is envisaged that network controller 603 will vary the number of names associated with each packet switch over time.

For pedagogical purposes, each of the names associated with a packet switch shall be labeled by the number of a physical packet switch suffixed with an alphabetic string. For example, when physical packet switch #10 has associated with it three names, the names could be #10*a*, #10*b* and #10*c*. It will be understood to those skilled in the art, that in the exemplary embodiment, all names and addresses are advantageously represented by binary strings, which may be interpreted as integers rather than as alphanumeric strings.

In accordance with the present invention, a plurality of different elemental networks, each having the topology of a "sink tree" with a "root" are formed from a plurality of packet switches and a plurality of simplex communication links. Furthermore, while each elemental network preferably comprises a subset, or proper subset (being a mathematical subset that does not contain all the elements of the inclusive set from which it is derived) of all the packet switches in network 601, at least one, and preferably all, of the packet switches are the root for at least two different elemental networks. Although each elemental network can comprise the same set of packet switches as another elemental network, it is preferred that the two elemental networks have a different topology.

The purpose of each elemental network in accordance with the present invention is to provide simplex access to a destination (either a packet switch or host computer) from all of the other packet switches in that elemental network. It is preferred that for each destination in network 601, there exist multiple, different elemental networks, each with the topology of a sink tree with a packet switch at the root. It is further preferred that each packet switch have access to every destination.

For the purposes of this specification, a "directed graph" with no cycles is called a "directed acyclic graph" and a "sink tree" is a directed acyclic graph that satisfies the following properties:

1. there is exactly one vertex, called the "root," from which no edges leave;

2. every vertex, except the root, has exactly one exiting edge;

3. there is a path from each vertex to the root; and 4. at least one vertex has at least two entering edges.

Figure 10:
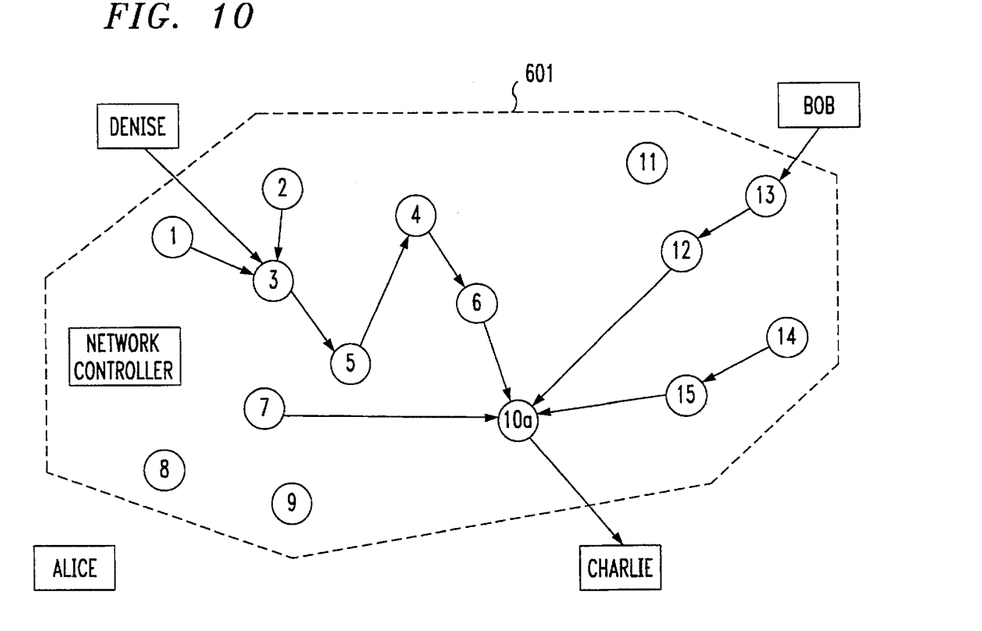
FIG. 10 depicts a first elemental network, with the topology of a sink tree in accordance with the exemplary embodiment.
Figure 11:
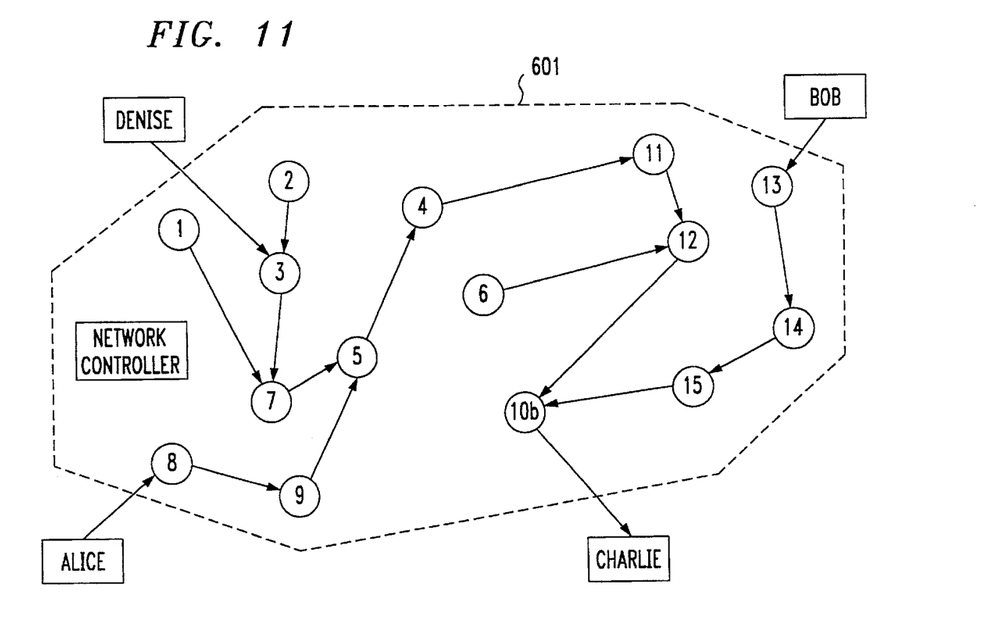
FIG. 11 depicts a second elemental network, with the topology of a sink tree in accordance with the exemplary embodiment.
Figure 12:
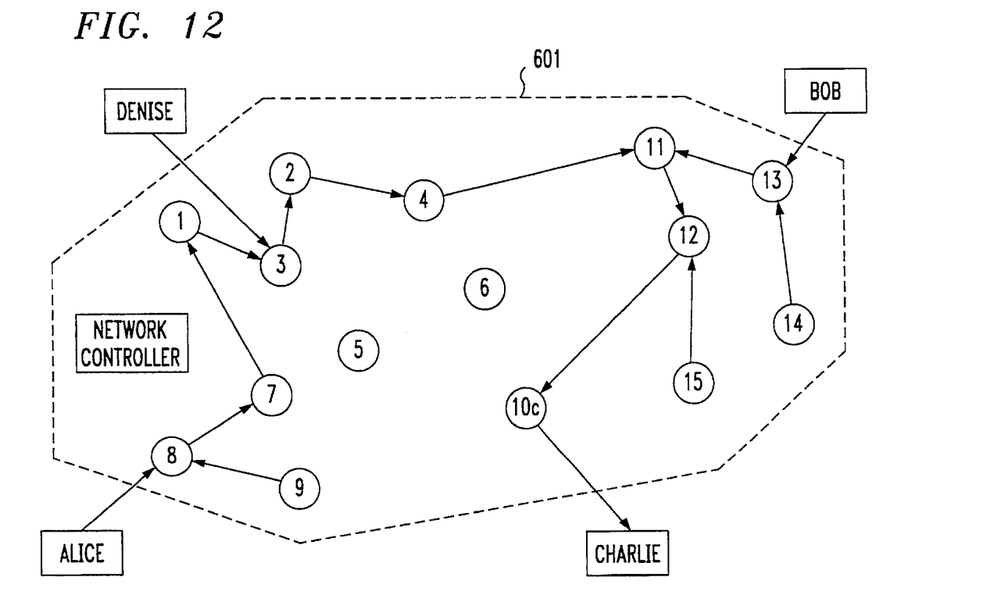
FIG. 12 depicts a third elemental network, with the topology of a sink tree in accordance with the exemplary embodiment.

For example, when packet switch #10 has three names associated with it (e.g., 10*a*, 10*b* and 10*c*), some or all of the router tables in network 601 are populated so that for those three names there are three different elemental networks that have packet switch #10 at the root. FIGS. 10, 11 and 12 depict the three different elemental networks associated with names 10*a*, 10*b* and 10*c*, respectively. Note that the elemental network associated with name 10*a* does not contain packet switches #8, #9 or #11 and the elemental network associated with name 10*c* does not contain packet switches #5 or #6.

Table 5 depicts that portion of the router table in packet switch #13 associated with names 10*a*, 10*b* and 10*c*, and Table 6 depicts that portion of the router table in packet switch with those addresses.

TABLE 5

A Portion of the Router Table in Packet Switch #13

| Input | Output |
|---|---|
| Addressee | Output Port |
| ... | ... |
| 10a | 12 |
| 10b | 14 |
| 10c | 11 |
| ... | ... |

TABLE 6

A portion of the Router Table in Packet Switch #12

| Input | Output |
|---|---|
| Addressee | Output Port |
| ... | ... |
| 10a | 10 |
| 10b | 10 |
| 10c | 10 |
| ... | ... |

For example, FIG. 10 depicts the illustrative elemental network associated with name "10a." In other words, a packet deposited in network 601 (at packet switch whose router table has been populated to recognize address "10a") with the address "10a" in its addressee field would be routed to packet switch #10, along the routes depicted. For example, when Bob delivered a packet with the address "10a" in the addressee field to packet switch #13, packet switch #13 would route that packet to packet switch #12. This is because the router table in packet switch #13 (as seen in Table 5) indicates a "12" as corresponding to the address "10a" entry. In turn, packet switch #12 would route the packet to packet switch #10, as directed by the router table shown in packet switch #12.

FIGS. 11 and 12 each illustrate elemental networks associated with the names "10b" and "10c," respectively. When Bob deposits a packet with the address "10b" in the addressee field to packet switch #13, the packet would be routed to packet switch #10 via packet switches #14 and #15, respectively. When Bob deposits a packet with the address "10c" in the addressee field to packet switch #13, the packet would be routed to packet switch #10 via packet switches #11 and #12, respectively. In contrast to virtual-circuit networks in the prior art, which always perform address translation, the packet switches in the exemplary embodiment preferably do not alter the address in a packet's addressee field. Thus, although the individual sink trees could be fabricated from a virtual-circuit network, it is preferred that they do not because of the unnecessary address translation that it would entail.

Figure 13:
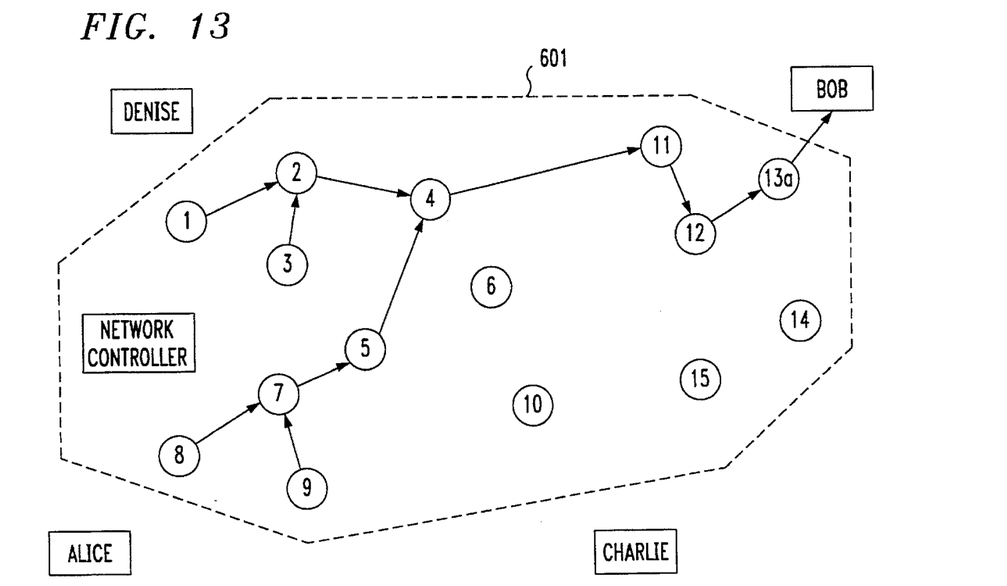
FIG. 13 depicts a fourth elemental network, with the topology of a sink tree in accordance with the exemplary embodiment.
Figure 14:
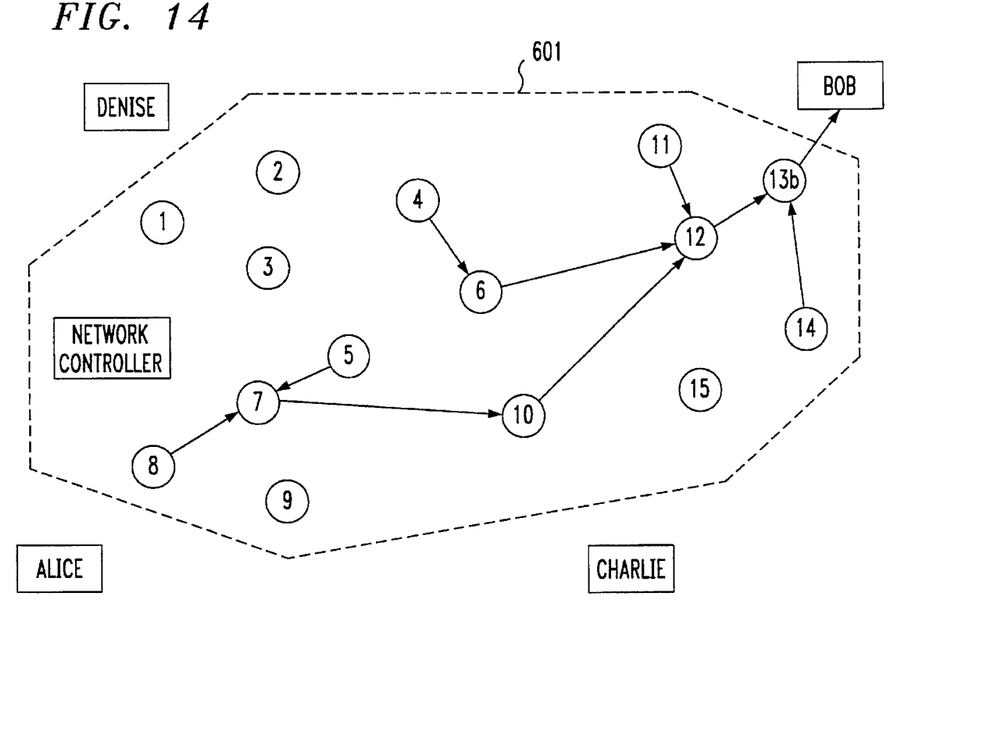
FIG. 14 depicts a fifth elemental network, with the topology of a sink tree in accordance with the exemplary embodiment.
Figure 15:
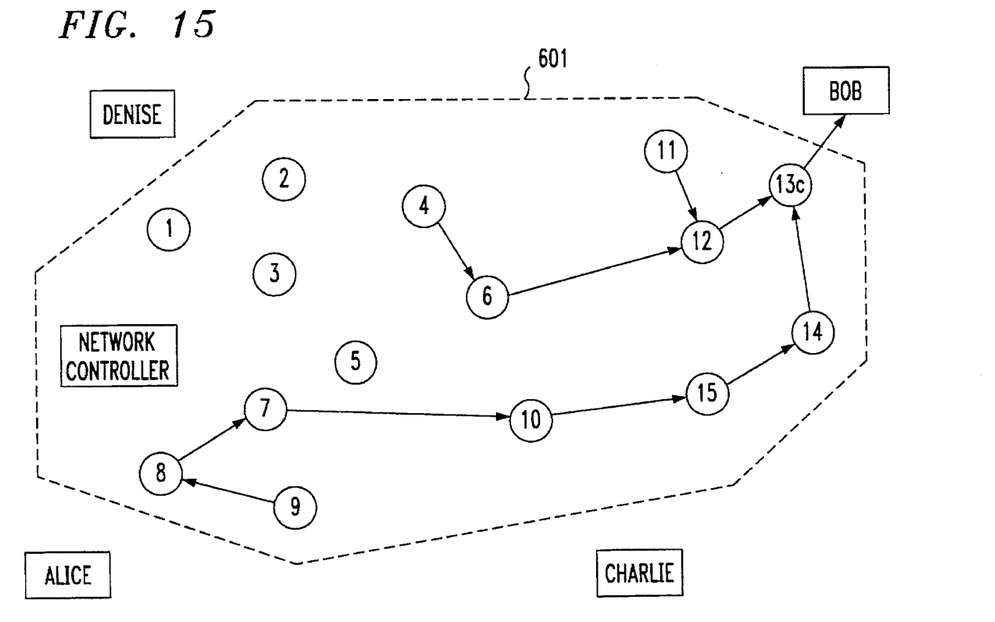
FIG. 15 depicts the fifth elemental network of FIG. 14 as it has been re-configured in accordance with the exemplary embodiment.

FIGS. 13 and 14 each depict illustrative elemental networks associated with the names "13a" and "13b," respectively. FIG. 15 depicts how the illustrative elemental network depicted in FIG. 14 can be re-configured when the communication link between packet switches #10 and #12 fails, becomes congested, or otherwise becomes unfavorable. Note that to re-configure the elemental network associated with the name #13b, the router tables in packet switches #10 and #15 must be altered. It should be noted that packet switch//5 has been dropped and packet switch #9 has been added to the elemental network depicted in FIG. 15 as part of the reconfiguration process.

The purpose of network controller 603 is to manage the flow of packets through network 601 either: (1) by changing the number of different elemental networks that compose network 601, (2) by changing which packet switches are on each of the different elemental networks, and/or (3) by changing the addresses which various sources use when addressing packets to a destination and, therefore, which elemental networks are actually used.

Figure 16:
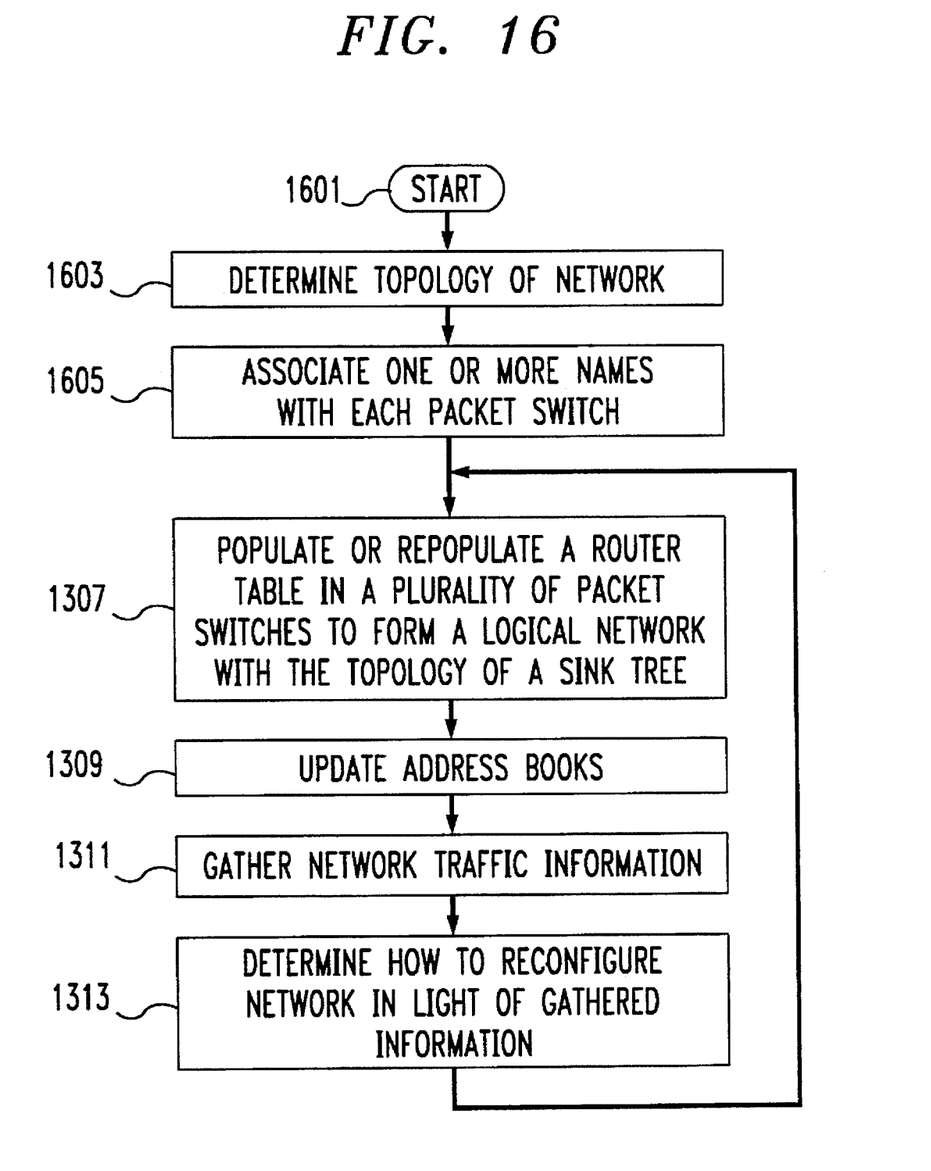
FIG. 16 depicts a flow chart of the exemplary operation of a network controller in accordance with the exemplary embodiment.

As shown in FIG. 16, network controller 603 begins the process of administering the network at step 1603 by determining the topology of the network. The techniques for doing so are well known in the art and can comprise either centralized or distributed techniques, although distributed techniques are preferred. Next, in step 1605, network controller 603 either assigns or associates one or more addresses to each packet switch in the network. The techniques for performing this step are also well known in the art and can comprise either centralized or distributed techniques.

Then, at step 1607, network controller 603 periodically or sporadically populates or repopulates the router tables in each of the packet switches so that, for each address that is associated with a packet switch, a elemental network is formed with the topology of a sink tree with the associated packet switch at the root of the tree.

When a connection requires quality-of-service guarantees, it is preferred that call establishment be done on demand at the time of call set-up. When, however, quality-of-service guarantees are not necessary, it is preferred that each host computer and packet switch that can send packets maintain an "address book," which indicates how each should address packets to a destination. For example, Table 7 depicts an illustrative address book for Alice. Alice's address book indicates that she should use address 13a to send packets to Bob, address 10c to send packets to Charlie, and address 3e to send packets to Denise.

TABLE 7

Alice's Address Book

|  | Bob | Charlie | Denise |
|---|---|---|---|
| Alice's address book | 13a | 10c | 3e |

For example, network controller 603 may effectively send a message to Alice that states "When you want to send packets to Bob, use address "13a;" when you want to send packets to Charlie, use address "10c;" when you want to send packets to Denise, use address "3e." Note that it is possible, and may be advantageous in certain circumstances, for two different hosts (e.g., Alice and Bob) to send packets to a single destination host (e.g., Charlie) with different addresses (e.g., 10c and 10a, respectively) simultaneously.

Network controller 603 advantageously keeps, and periodically or sporadically changes, a "network address book," which is a composite of the address books kept by each host. A typical network address book is depicted in Table 8.

TABLE 8

Network Controller 601 Address Book
(addressor appears on left, addressee on top)

|  | Alice | Bob | Charlie | Denise |
|---|---|---|---|---|
| Alice's address book | n/a | 13a | 10c | 3e |
| Bob's address book | 8g | n/a | 10a | 3e |
| Charlie's address book | 8a | 13c | n/a | 3d |
| Denise's address book | 8b | 13a | 10f | n/a |

In step 1311, network controller 603 gathers network traffic information, which preferably comprises congestion, administration and reliability information from around the network so that it can have the information that it needs to gracefully deal with network congestion, communication link and packet switch failures and the addition and subtraction of host computers, packet switches and communication links. It will be clear to those skilled in the art how to implement step 1311. In step 1313, network controller 603 uses the information gathered in step 1311 to determine how to re-configure network 601. In other words, whether to add or subtract elemental networks, whether to add or subtract packet switches to elemental networks, whether to re-populate router tables, and/or whether to change the address books of some of the host computers and/or packet switches. In step 1313, network controller 603 also deals with the addition and/or subtraction of packet switches, communication links and host computers. It will be clear to those skilled in the art how to perform step 1313. From step 1313, control passes back to step 1607 where network controller re-populates the various packet switches to implement the new set of elemental networks.

For each name associated with each packet switch in network 601, there is a different elemental network in the topology of the tree. The advantages to be gained from the use of elemental networks in the topology of sink trees, in contrast to datagram and virtual-circuit networks are primarily these. First, like datagram networks and unlike virtual-circuit networks, there is no node-by-node call set-up or call tear-down procedure necessary. This is particularly advantageous when the call set-up and/or call tear-down procedure is expensive or slow. Second, like virtual-circuit networks and unlike datagram networks, network 601 preserves the sequential order in which the packets are presented to the network because from any given source to any destination, there is only one path. And third, the architecture of the packet switches can be less expensive to make and use than the packet switches used in datagram and virtual-circuit switches in the prior art.

What is claimed is:

1. A packet-based telecommunications network comprising:

a plurality of packet switches;

a plurality of simplex communication links that connect said packet switches in a plurality of different elemental networks, each different elemental network providing access to a destination from a subset of said plurality of packet switches, each different elemental network having the topology of a sink tree with a root, and such that at least one of said packet switches is the root for at least two of said different elemental networks; and a network controller for managing the flow of packets through said packet-based telecommunications network by changing the number of different elemental networks.

2. The packet-based telecommunications network of claim 1 wherein said network controller manages the flow of packets through said packet-based telecommunications network by changing which packet switches are on each of said different elemental networks.

3. The packet-based telecommunications network of claim 1 wherein each of said packet switches is capable of being the root for at least two of said different elemental networks.

4. The packet-based telecommununications network of claim 1 wherein each of said packet switches is the root for at least two of said different elemental networks.

5. The packet-based telecommunications network of claim 1 wherein said destination is a packet switch.

6. The packet-based telecommunications network of claim 1 wherein at least one of said subsets is a proper subset.

7. The packet-based telecommunications network of claim 1 wherein said network controller associates each different elemental network with a unique address.

8. The packet-based telecommunications network of claim 1 wherein at least one of said packet switches can access said destination via at least two of said different elemental networks.

9. The packet-based telecommununications network of claim 8 wherein each of said different elemental networks is associated with a unique address.

10. The packet-based telecommunications network of claim 9 wherein said network controller indicates to one of said packet switches which of said unique addresses to use to access said destination.

11. The packet-based telecommunications network of claim 1 wherein said network controller is centralized.

12. The packet-based telecommunications network of claim 1 wherein said network controller is at least partially distributed.

13. The packet-based telecommununications network of claim 1 wherein said network controller is distributed.

14. The packet-based telecommunications network of claim 10 wherein each of said packet switches can access every other packet switch via at least two of said different elemental networks.

15. A packet-based telecommunications network comprising:

(1) a plurality of packet switches, including a source packet switch and also including a destination packet switch that is associated with a plurality of addresses, each of which packet switches comprises:

(i) at least one input port for receiving a packet that contains one of said addresses, (ii) at least two output ports, (iii) a router table that has a plurality of addresses entries, including at least one of said addresses, and an indicia of one of said packet switches associated with each of said addressee entries, and (iv) a switching fabric for receiving said packet from one of said input ports and for directing said packet to another of said packet switches, via one of said output ports, based on said address an said router table;

(2) a plurality of simplex communication links that connect, for each of said addresses, said packet switches to form a different elemental network in the topology of a sink tree with a root with said destination packet switch being at said root of said sink tree; and (3) a network controller for managing the flow of packets through said packet-based telecommunications network by changing the number of different elemental networks and for controlling said telecommununications network by indicating to said source packet switch which of said addresses said source packet should use when addressing packets to said destination packet switch.

16. The packet-based telecommunications network of claim 15 wherein said network controller is centralized.

17. The packet-based telecommunications network of claim 15 wherein said network controller is at least partially distributed.

18. The packet-based telecommunications network of claim 15 wherein said network controller is distributed.

19. The packet-based telecommununications network of claim 18 wherein at least some of said simplex communication links are wireless links.

20. A method for use in a packet-based telecommunications network of packet switches that are connected by a plurality of communication links, the method comprising:

determining the topology of said network;

associating at least two names with at least one of said packet switches;

populating a router table in a plurality of said packet switches so that for each name, said packet switches and said communication links from a different elemental network, each with the topology of a sink tree with a root: and managing the flow of packet through said packet-based telecommunications network by changing a number of different elemental networks.

21. The method of claim 20 further comprising:

receiving network traffic information about said packet-based telecommunications network; and re-populating at least one of said router tables based on said network traffic information.

22. The method of claim 20 further comprising:

receiving network traffic information about said packet-based telecommunications network; and adding at least one of said packet switches to at least one of said different elemental networks based on said network traffic information.

23. The method of claim 20 further comprising:

receiving network traffic information about said packet-based telecommunications network; and signaling to one of said packet switches which name it should use when addressing another of said packet switches based on said network traffic information.

24. The method of claim 20 wherein said packet switch associated with said names is the root of said sink tree.

25. The method of claim 20 wherein at least two names are associated with each of said packet switches.

26. A method comprising:

determining the topology of a network of packet switches that are connected by communication links, wherein each of said packet switches comprises:

(i) at least one input port for receiving a packet that contains a first address of one of said packet switches, (ii) at least two output ports, (iii) a router table that has a plurality of addressee entries and an indicia of one of said output ports associated with each of said addressee entries, and (iv) a switching fabric for receiving said packet from one of said input ports and for directing said packet to one of said output ports based on said first address and said router table;

associating at least a second and third addresses with one of said packet switches;

populating each of said router tables so that for said second address said packet switches and said communication links form a elemental network with the topology of a first tree, and so that for said third address said packet switches and said communication links form a elemental network with a topology of a second tree that is different than said first tree; and managing the flow of packets through said packet-based telecommununications network by changing a number of different elemental networks.

27. The method of claim 26 wherein said packet switch associated with said second and third addresses is the root of said first tree and said second tree.

28. The method of claim 26 wherein all of said communication links are wireline links.

29. The method of claim 26 wherein all of said communication links are wireless links.

* * * * *